United States Patent [19]

Smith

[11] Patent Number: 4,927,079

[45] Date of Patent: May 22, 1990

[54] PLURAL COMPONENT AIR SPRAY GUN AND METHOD

[75] Inventor: David H. Smith, Redwood City, Calif.

[73] Assignee: Binks Manufacturing Company, Franklin Park, Ill.

[21] Appl. No.: 253,262

[22] Filed: Oct. 4, 1988

[51] Int. Cl.⁵ .............................. B05B 7/08; B05B 1/28
[52] U.S. Cl. ...................................... 239/11; 239/297; 239/300; 239/422; 239/423
[58] Field of Search ............... 239/290, 296, 297, 300, 239/422, 423, 424, 433, 11

[56] References Cited

U.S. PATENT DOCUMENTS

| | | | |
|---|---|---|---|
| 2,335,116 | 11/1943 | Hansen | 234/422 |
| 3,986,673 | 10/1976 | Beck | 239/423 |
| 4,428,530 | 1/1984 | Chabria | 239/422 |

*Primary Examiner*—Andres Kashnikow
*Assistant Examiner*—Karen B. Merritt
*Attorney, Agent, or Firm*—Juettner Pyle Lloyd & Verbeck

[57] ABSTRACT

A plural component air spray gun is characterized by a spray head assembly that has a pair of hemispherically shaped fluid outlet orifices, the straight sides of which are facing, parallel and separated by a relatively thin wall. Each orifice receives a respective one of two liquid materials delivered through associated liquid supply passages, and the passages are inclined so that streams of liquid emitted from the orifices come together a short distance beyond the orifices. Air emitted from an atomizing air orifice surrounding the two fluid orifices mixes and breaks up the liquid material streams into an atomized conical spray. To form the conical spray into a fan-shaped pattern, an air cap directs air jets against opposite sides of the spray.

22 Claims, 2 Drawing Sheets

PLURAL COMPONENT AIR SPRAY GUN AND METHOD

BACKGROUND OF THE INVENTION

The present invention relates to improvements in spray guns, and in particular to an air spray gun for spraying two component chemically reactive materials.

One type of spray gun for plural component materials is disclosed in U.S. Pat. No. 3,366,337 to Brooks et al. In that spray gun, which is of the airless type, means are provided for intimately mixing and spraying two liquid reactants immediately prior to the situs of application. This accomplished by impinging jets or streams of the reactants against each other under pressure from opposed directions into the rearward end of a relatively large mixing chamber within the gun, whereby the reactants are mixed within the chamber and then discharged through an airless outlet orifice at a forward end of the chamber.

At the end of a spraying operation with the spray gun of said U.S. Pat. No. 3,366,337, mixed reactants within the chamber must be quickly removed before completion of the reaction and formation of a blockage in the gun. To that end, means are provided for introducing a stream of solvent into the rearward end of the chamber after the gun has been operated, so that the chamber and outlet orifice can be cleaned of residual material to enable further spraying operations. Disadvantages of the technique are that a separate container is usually required to collect the discharge during cleaning, it can happen that solvent contacts and mars a finished product, the use of solvent adds cost to the operation, and in view of environmental considerations, it is not desirable that solvent be sprayed into the air. In addition, cleaning of the chamber with solvent is often less than thorough, with the result that the gun must be disassembled to remove hardened material, and customary practice contemplates soaking the gun in solvent to remove mixed reactants whenever the gun is not going to be used for a period of time. Also, with some types of modern day material, mere impingement together of reactants in a chamber does not provide satisfactory mixing of the materials, and airless spraying of the materials requires the provision of airless pumps and often does not result in a degree of atomization that is satisfactory.

OBJECTS OF THE INVENTION

An object of the present invention is to provide a plural component air spray gun, which does not need to be flushed clean of reactive materials between spraying operations.

Another object is to provide such a spray gun, in which reactive materials are brought together only externally of the gun where they are thoroughly pneumatically mixed and atomized.

A further object is to provide such a spray gun having fluid outlet orifices that are uniquely configured to bring the reactive components together in a manner that enhances their mixing and atomization.

SUMMARY OF THE INVENTION

In accordance with the present invention, a plural component external mix air spray gun comprises a fluid nozzle having first and second fluid outlet orifices, each having a straight side and a curved side extending between opposite ends of the straight side, with the straight sides being in facing, spaced and generally parallel relationship. Also included are means for delivering first and second liquid materials to the respective first and second orifices for emission therefrom in first and second liquid streams; air orifice means; and means for delivering air to the air orifice means for emission therefrom and interaction with the first and second liquid streams to mix and break up the streams into an atomized spray.

In a preferred embodiment, the air orifice means comprises an air orifice encircling the first and second fluid orifices, so that air emitted therefrom is in surrounding relationship to the first and second liquid streams to mix and atomize the streams into an expanding conical spray. Also, the means for delivering the first and second liquids delivers the same to the first and second fluid orifices for emission therefrom in streams that are inclined toward each other, such that the streams come together beyond the fluid orifices at an included angle in the order of about 4° to 12°. The straight sides of the fluid orifices may be spaced apart by a distance in the order of about 0.010" to 0.020", and also included are means for directing air jets against opposite sides of the conical spray to flatten the spray into a fan-shaped pattern.

The invention also contemplates a method of spraying plural component materials, which comprises the steps of emitting first and second liquid material streams from first and second fluid outlet orifices that are each configured to have a straight side and a curved side extending between opposite ends of the straight side, with their straight sides are in facing, spaced and generally parallel relationship; and pneumatically mixing and breaking up the first and second liquid streams into an atomized spray.

In a preferred practice of the method, the step of pneumatically mixing and breaking up the liquid streams comprises emitting air from an air orifice encircling the first and second fluid orifices, so that the emitted air surrounds the first and second liquid streams to mix and atomize the streams into an expanding conical spray. The fluid orifices are hemispherically shaped, and the step of emitting the first and second liquid streams from the fluid orifices emits the streams in converging relationship so that they come together beyond the orifices at an included angle in the order of about 4° to 12°. The orifices are positioned so that their straight sides are spaced apart by a distance in the order of about 0.010" to 0.020", and also included is the step of directing air jets against opposite sides of the conical spray to flatten the spray into a fan-shaped pattern.

The foregoing and other objects, advantages and features of the invention will become apparent upon a consideration of the following detailed description, when taken in conjunction with the accompanying drawings.

DETAILED DESCRIPTION

Figure 1:
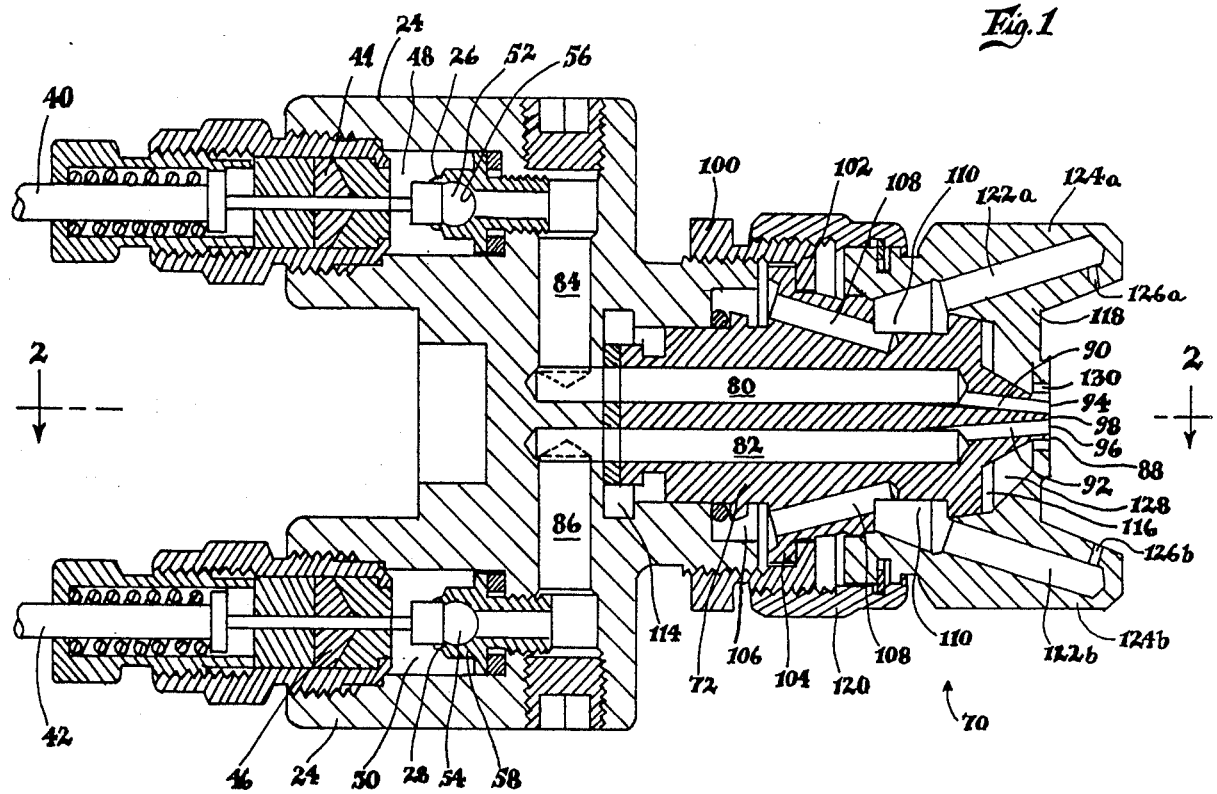
FIG. 1 is a cross sectional top plan view of a plural component air spray head assembly embodying the teachings of the present invention.

An external mix plural component air atomizing spray coating apparatus as shown in the drawings may take the form of a hand held air spray gun, indicated generally at 20. The spray gun includes a gun body 22 (FIG. 4) having a rearward handle (not shown) that is grippable by an operator to hold and manipulate the gun. At its forward end the body carries a head 24 having a pair of liquid inlet passages 26 and 28, lower ends of which connect through respective fittings 30 and 32 to respective supplies of liquid materials under pressure, which materials may be reactants. As is conventional, a lower end of the handle has a fitting for connecting an air supply passage in the handle to a source of air under pressure, whereby liquid materials and air may be provided under pressure to the spray gun.

A trigger 34 (FIG. 4) is pivotally connected at 36 to the gun body 22 for actuating an air valve means (not shown) in the gun handle and a fluid valve means that includes a transversely extending bar 38 coupled to the trigger. The trigger is movable between a forward position where the air and fluid valve means are closed and a rearward position toward the gun handle to open the air fluid valve means. The fluid valve means also includes a pair of valve stems 40 and 42 extending forwardly from the bar 38 through respective packings 44 and 46 in the head 24 and into chambers 48 and 50 that communicate with respective ones of the liquid inlet passages 26 and 28. At their forward ends the valve stems 40 and 42 carry respective balls 52 and 54 that are moved against associated seats 56 and 58 to interrupt flows of liquid materials through the seats when the trigger is in its forward position, and that are moved off of the seats to establish paths for flows of liquid materials through the seats when the trigger is retracted. The extent of movement of the balls off of the seats when the trigger is fully retracted is determined by appropriate adjustment of nuts 60 that connect rearward ends of the valve stems to the bar.

The air valve means in the gun handle, when opened by retraction of the trigger 34, establishes a path for a flow of air through the gun body 22 to a passage 62 in the head 24. The pressure of air in the passage is determined by the pressure of the air supply, and a passage 64 extends forwardly through the head from the passage 62. A forward end of an air valve stem 66 is movable by an air control knob (not shown) against and rearwardly away from a seat 68 to control a flow of air from the passage 62 into the passage 64 when the air valve means is opened.

Figure 2:
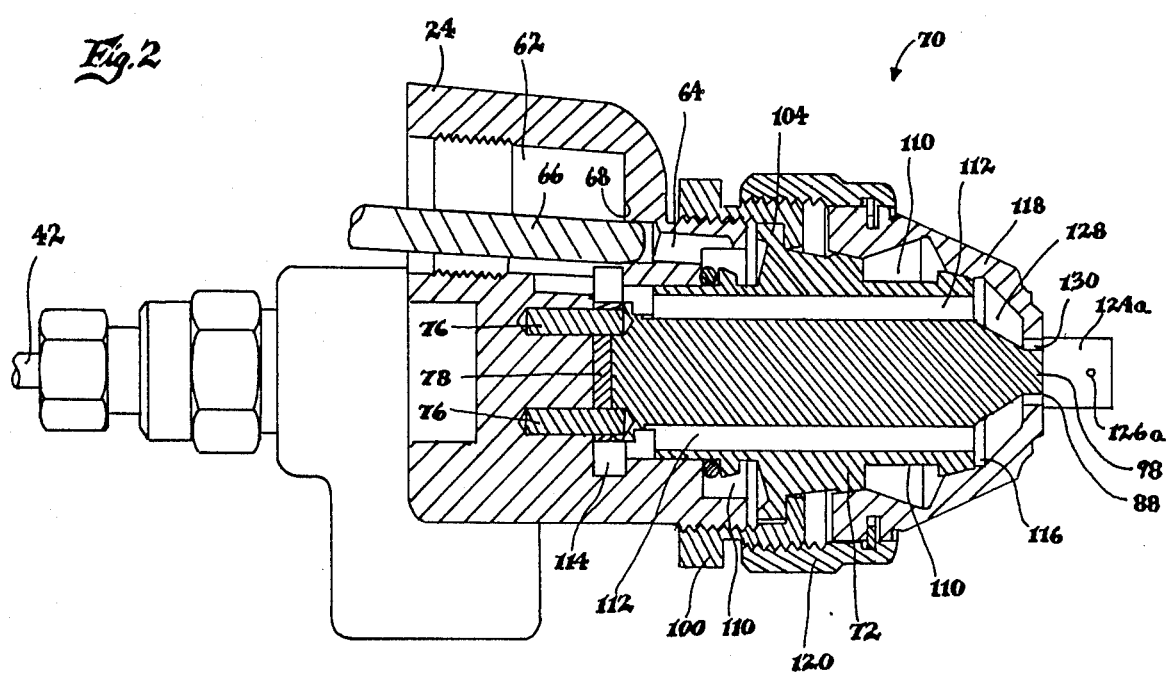
FIG. 2 is a cross sectional side elevation view taken substantially along the line 2—2 of FIG. 1.
Figure 3:
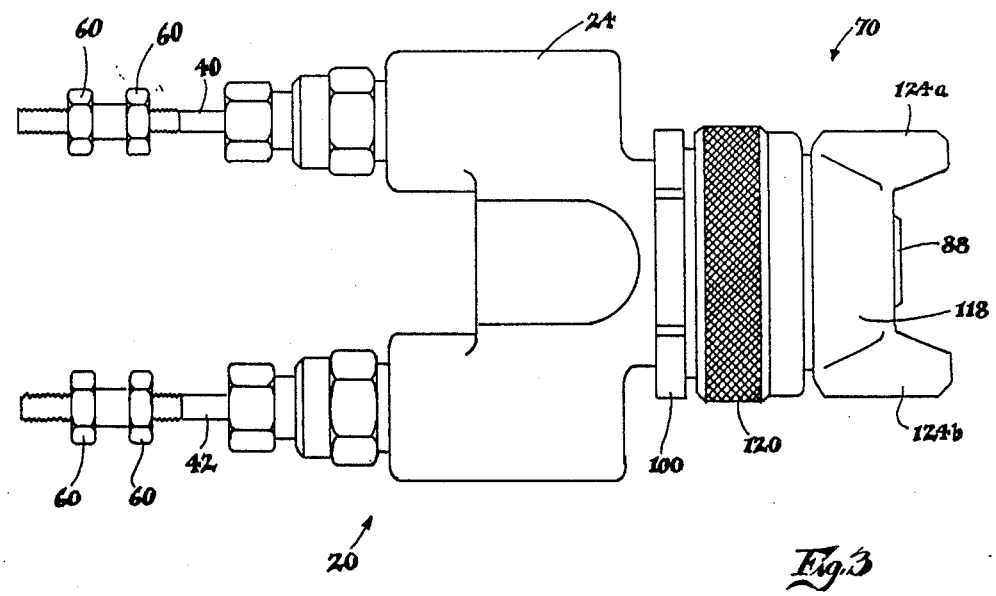
FIG. 3 is a top plan view of the spray head assembly.

With particular reference to FIGS. 1 and 2, mounted on the forward end of the head 24 is a spray head assembly, indicated generally at 70, configured according to the invention. The spray head assembly includes a fluid nozzle 72 that extends at its rearward end into the head and is rotationally oriented with respect to the head by means of pins 76, and a seal 78 is between the rear of the nozzle and the head. A pair of fluid passages 80 and 82 extend through the nozzle in the axial direction and connect at their rearward ends with respective fluid passages 84 and 86 in the head. Upon movement of the trigger 34 toward the handle and retraction of the valve stems 40 and 42, the passage 84 is placed into communication with the liquid inlet passage 26 and the passage 86 with the liquid inlet passage 28, so that one of the liquid materials is then delivered to the nozzle passage 80 and the other to the passage 82.

The passages 80 and 82 terminate at their forward ends short of a circular front end 88 of the fluid nozzle 72. Extending forwardly and slightly radially inwardly from the forward ends of the passages 80 and 82 are respective fluid delivery passages 90 and 92 of hemispherical cross section, which open onto the front end to define respective hemispherical fluid outlet orifices 94 and 96 that are separated by a wall 98. Straight sides of the fluid orifices are defined by opposite edges of the wall, and are in facing, parallel relationship and separated by the thickness of the front end of the wall, which may be on the order of about 0.010" to 0.020" thick. The passages 90 and 92 are inclined toward one another, each at about 2° to 6° with respect to the center axis of the fluid nozzle, so that streams of liquid materials emitted from the fluid orifices come together beyond the orifices at an included angle in the order of about 4° to 12°.

The fluid nozzle 72 is mounted on the forward end of the spray gun head 24 by a retainer ring 100 that is threaded onto the head and has a radially inwardly extending annular shoulder 102 that abuts a radially outwardly extending annular flange 104 on the fluid nozzle. Rearwardly of the flange the fluid nozzle forms an annular chamber 106 with the head. The head air passage 64 communicates with the chamber, and a plurality of circumferentially spaced air passages 108 extend axially forwardly and radially inwardly through the nozzle from the chamber to an annular recess 110 in the nozzle. A second plurality of circumferentially spaced air passages 112 extend longitudinally through the nozzle. Rearward ends of the passages 112 open into and annular chamber 114 in communication with the air passage 62, and forward ends of the passages open onto a forward surface 116 of the nozzle.

An air cap 118 is held in place around and sealed with the fluid nozzle 72 by a retainer ring 120 threaded onto the ring 100. The air cap extends across the annular recess 110 in the nozzle, communicating with the recess are air passages 122a–b in respective diametrically opposed ears 124a–b of the air cap, and diametrically opposed air outlet orifices 126a–b in the ears exit from the passages. The orifices are arranged to direct opposing air jets against opposite sides of an expanding and conically shaped atomized spray of the liquid materials to flatten the spray into a fan-shaped pattern, as will be described. The flow rate of air from the orifices is determined by the position of the end of the air valve stem 66 with respect to its seat 68.

The spray head assembly 70 is particularly useful for spraying two component chemically reactive liquid materials. In operation, upon movement of the trigger 34 toward the gun handle, the air valve means is opened first and then the fluid valve means. Opening the fluid valve means comprises retracting the bar 38 and valve stems 40 and 42 to move the balls 52 and 54 off of their seats 56 and 58 to establish paths for a flow of one liquid material through the head passage 84 and the fluid nozzle passages 80 and 90 to the outlet orifice 94, and for the other liquid material through the head passage 80 and the fluid nozzle passages 82 and 92 to the outlet orifice 96. The liquid materials are emitted from their respective fluid outlet orifices in the form of hemispherical streams, which because of the angular inclination of the fluid delivery passages 90 and 92 come together along their flat sides a short distance beyond the orifices. The air cap 118 defines an annular chamber 128 with the nozzle surface 116, as well as a circular atomizing air outlet orifice 130 with the nozzle front end 88, which orifice communicates with the chamber and encircles the pair of fluid orifices. Consequently, air flowing through the air passages 112 in the nozzle enters the chamber, and from the chamber flows through the circular orifice in the form of a cylinder of air that surrounds the liquid streams to thoroughly mix and break up the streams into an expanding, conically shaped and atomized spray. Because it is usually more desirable to have a fan-shaped spray, the air jets emitted from the air cap orifices 126a–b are impinged against opposite sides of the conical spray to flatten it into a fan-shaped pattern. The volume flow rate of air emitted through the atomizing air orifice 130 is determined by the pressure of the air orifice 130 is determined by the pressure of the air supply, and for a given air supply pressure, the volume flow rate of air from the air cap orifices is determined by the placement of the forward end of the air valve stem 66 with respect to its seat 68. If desired or necessary, the air valve stem may be moved against its seat so that no air is emitted from the air cap orifices, in which case the resulting spray will be conical.

Figure 4:
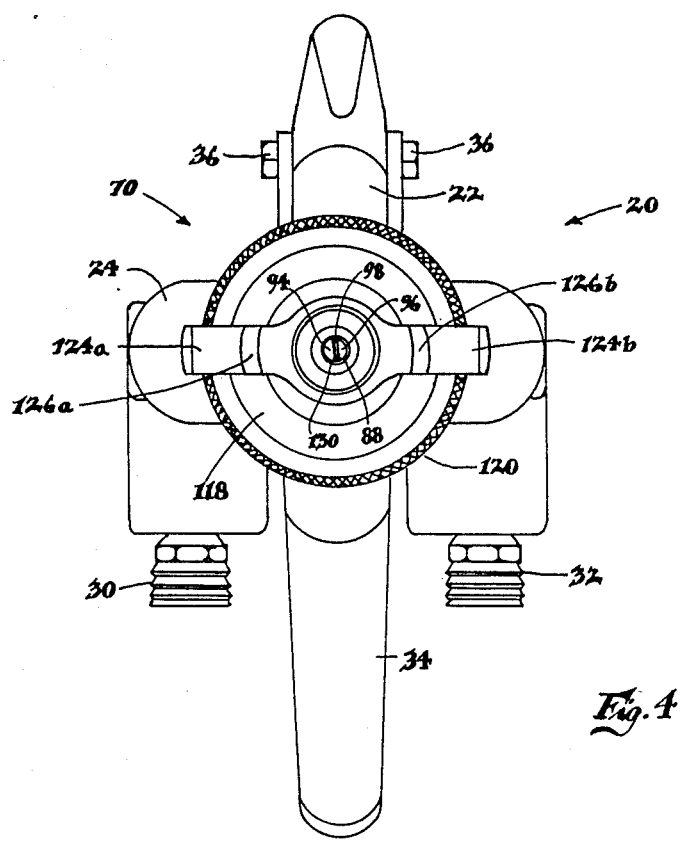
FIG. 4 is a front elevation view of a spray gun having the spray head assembly.

The air cap 118 may be placed in any desired rotational orientation with respect to the fluid nozzle 72. It has been found, however, that for some fluids which are particularly difficult to thoroughly mix, best results are obtained if the air cap is oriented so that the air jets emitted from the orifices 126a–b lie in a plane that is perpendicular to the major plane of the wall 98, as seen in FIG. 4.

The invention therefore provides an improved plural component, external mix air spray gun. Because the components are maintained separate within the gun, and not mixed until they are outside of the fluid nozzle, when they are reactive they cannot come together and harden within the gun. Also, because the components are emitted in the form of hemispherical streams and come together along their flat surfaces a short distance outwardly from the fluid orifices to form a composite cylindrical stream, they may be pneumatically atomized in a manner of proven reliability and effectiveness.

While one embodiment of the invention has been described in detail, various modifications and other embodiments thereof may be devised by one skilled in the art without departing from the spirit and scope of the invention, as defined in the appended claims.

What is claimed is:

1. A plural component external mix air spray gun, comprising a fluid nozzle having first and second hemispherically-shaped fluid outlet orifices having flat sides in facing and spaced relationship; means for delivering first and second liquid materials to said first and second fluid orifices, respectively, for emission therefrom in first and second hemispherically-shaped unatomized liquid streams that are inclined toward each other and come together along their flat sides beyond said orifices in a composite cylindrical stream of the first and second materials; and pneumatic means for mixing and breaking up the composite cylindrical liquid stream into an atomized spray downstream from said first and second fluid orifices, said pneumatic means including an air outlet orifice surrounding said first and second fluid orifices and means for delivering air to said air orifice for emission therefrom in surrounding relationship to the first and second liquid streams and the composite cylindrical stream.

2. An air spray gun as in claim 1, wherein said first and second fluid orifices are separated by a distance in the order of 0.010" to 0.020".

3. An air spray gun as in claim 1, wherein said first and second fluid orifices emit streams of the first and second liquid materials that are inclined toward each other and come together beyond said fluid orifices at an included angle in the order of about 4° to 12°.

4. An air spray gun as in claim 1, wherein said pneumatic means breaks up the cylindrical liquid stream into a conical spray, and including means for directing air jets against opposite sides of the conical spray to flatten the spray into a fan-shaped pattern.

5. A plural component external mix air spray gun, comprising a fluid nozzle having first and second fluid outlet orifices, each orifice having a straight side and a curved side extending between opposite ends of the straight side, said orifices having their straight sides in facing, spaced and generally parallel relationship; means for delivering first and second liquid materials to said first and second fluid orifices, respectively, for emission therefrom in first and second hemispherically-shaped unatomized liquid streams that are inclined toward each other and come together along their straight sides beyond said orifices in a composite cylindrical stream of the first and second materials; air orifice means; and means for delivering air to said air orifice means for emission therefrom and interaction with the composite cylindrical stream to mix and break up the cylindrical stream into an atomized spray downstream from said first and second fluid orifices.

6. An air spray gun as in claim 5, wherein said air orifice means comprises an air orifice encircling said first and second fluid orifices, so that air emitted therefrom surrounds the cylindrical stream of the first and second liquid streams to mix and atomize the cylindrical stream into an expanding conical spray.

7. An air spray gun as in claim 5, wherein said first and second fluid orifices are hemispherical.

8. An air spray gun as in claim 5, wherein said means for delivering the first and second liquid materials delivers the liquids to said first and second fluid orifices for emission therefrom in streams that are inclined toward each other and come together beyond said first and second fluid orifices at an included angle in the order of about 4° to 12°.

9. As air spray gun as in claim 5, wherein said straight sides of said fluid orifices are spaced apart by a distance in the order of about 0.010" to 0.020".

10. An air spray gun as in claim 5, wherein the air emitted from said air orifice means mixes and breaks up the cylindrical liquid stream into an atomized and expanding conical spray, and including means for directing air jets against opposite sides of the conical spray to flatten the spray into a fan-shaped pattern.

11. An air spray gun as in claim 5, wherein said means for delivering the first and second liquid materials maintains the liquid materials separate while they are being delivered to said first and second fluid orifices.

12. A method of spraying plural component liquid materials, comprising the steps of emitting first and second hemispherically-shaped unatomized liquid material streams, from respective and separate first and second fluid orifices, that are inclined toward each other and come together along their flat sides beyond the fluid orifices in a composite cylindrical stream of the first and second materials; and pneumatically mixing and breaking up the composite cylindrical stream of the first and second liquid streams into an atomized spray downstream from the first and second fluid orifices by emitting air from an air orifice surrounding the first and second fluid orifices, so that the emitted air is in surrounding relationship to the first and second liquid streams and the composite cylindrical stream.

13. A method as in claim 12, wherein said step of emitting the liquid streams in converging relationship causes the streams to come together at an included angle in the order of about 4° to 12°.

14. A method as in claim 12, including the step of positioning the first and second fluid orifices so that they are separated by a distance in the order of about 0.010" to 0.020".

15. A method as in claim 12, wherein said step of pneumatically mixing and breaking up the cylindrical liquid stream mixes and breaks up the stream into an atomized and expanding conical spray, and including the step of directing air jets against opposite sides of the conical spray to flatten the spray into a fan-shaped pattern.

16. A method of spraying plural component liquid materials, comprising the steps of emitting first and second unatomized liquid streams from first and second fluid orifices that are each configured to have a straight side and a curved side extending between opposite ends of the straight side and that are positioned so that their straight sides are in facing, spaced and generally parallel relationship, such that the first and second liquid streams are configured complementary to the first and second fluid orifices and are inclined toward each other and come together along their straight sides downstream from the fluid orifices in a composite cylindrical stream of the first and second streams; and pneumatically mixing and breaking up the cylindrical liquid stream into an atomized spray downstream from the fluid orifices.

17. A method as in claim 16, wherein said pneumatically mixing and breaking up step comprises emitting air from an orifice that surrounds the first and second fluid orifices so that the emitted air is in surrounding relationship to the first and second liquid streams and the composite cylindrical stream to mix and atomize the cylindrical stream into an expanding conical spray.

18. A method as in claim 16, wherein said step of emitting the first and second liquid streams comprises emitting the streams from first and second fluid orifices that are hemispherically shaped.

19. A method as in claim 16, wherein said step of emitting the first and second liquid streams causes the streams to come together at an included angle in the order of about 4° to 12°.

20. A method as in claim 16, including the step of positioning the first and second fluid orifices so that their straight sides are spaced apart by a distance in the order of about 0.010" to 0.020".

21. A method as in claim 17, including the step of directing air jets against opposite sides of the conical spray to flatten the spray into a fan-shaped pattern.

22. A method as in claim 16, including the steps of delivering the first and second liquid materials to the first and second fluid orifices for emission therefrom in the first and second liquid streams, and maintaining the first and second liquid materials separate from one another while they are being delivered to the first and second fluid orifices.

* * * * *